H. Black,
Hay Elevator.
No. 3811. Reissued Jan. 25. 1870.
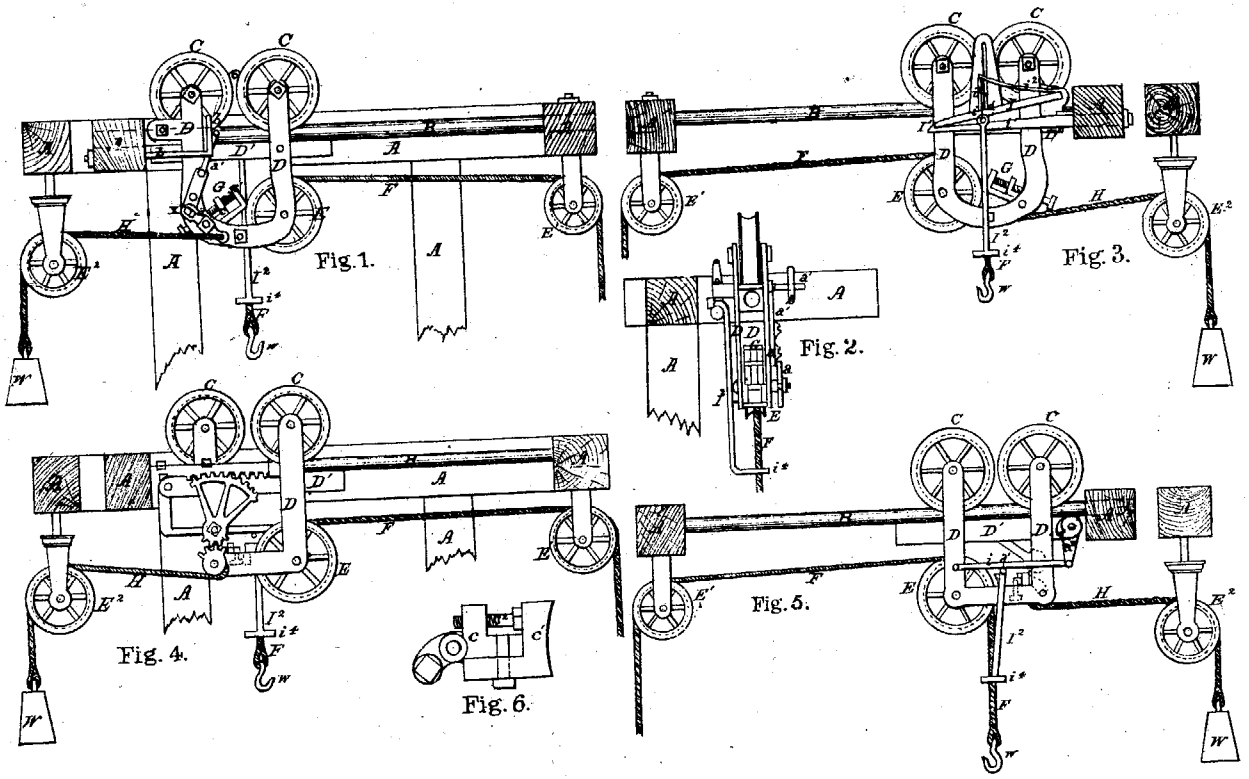
Witnesses:
Watts T. Loomis
Sidney A. Loomis
Inventor:
Henry Black by
A Loomis his atty
assignee The Lawrence
Mower Company by
N. PETERS, PHOTO-LITHOGRAPHER, WASHINGTON, D. C.

United States Patent Office.

THE WARRIOR MOWER COMPANY, OF LITTLE FALLS, NEW YORK, ASSIGNEES OF HENRY BLACK,

*Letters Patent No.* 57,850, *dated September* 11, 1866; *reissue No.* 3,811, *dated January* 25, 1870.

IMPROVED HOISTING-APPARATUS.

The Schedule referred to in these Letters Patent and making part of the same

*To all whom it may concern:*

Be it known that HENRY BLACK, of Carrollton, in the county of Greene, in the State of Illinois, made certain new and useful Improvements in Hoisting-Apparatus; and I do hereby declare that the following is a full, clear, and exact description thereof, reference being had to the accompanying drawings, and to the letters of reference marked thereon.

Figures 1, 3, 4, and 5, are sectional side elevations of the improved "apparatus."

Figure 2 is a transverse sectional elevation of it.

Figure 6 is a dovetailed elevation of a brake, which is or may be used.

The object of this invention is to produce an apparatus for hoisting goods of any kind, such as bales, boxes, or loose hay in forksful, and after such goods have been hoisted to the required elevation, by an automatic action of the machinery, they are made to travel in a lateral direction, any required distance, to the point of delivery.

The construction of the travelling-carriage or pulleys is such that the load, on arriving at a certain elevation, will release the carriage automatically from its stationary position, and allow the power applied to move it along the way, and when the load has been moved to the proper point and delivered, the carriage will return to its former position, and be secured there also by an automatic action. The hoisting-rope is prevented from running over the pulley too rapidly, by means of an automatic brake.

To enable others skilled in the art to make and use this improved hoisting-apparatus, I will proceed to describe its construction and operation.

A A A are the beams of a building, or the timbers of a frame, constructed for the purpose of sustaining this apparatus.

B is an iron rod, stretched tightly between two or more of the timbers A, and so arranged that the wheels C C can travel back and forth upon it as upon a track.

D is a metallic carriage, formed of two side-pieces, one of which is placed on either side of the rod B.

In the figs. 1 and 3, these side-pieces are shaped somewhat in the form of the shoe of a horse, and in figs. 4 and 5, they are formed with two vertical bars, connected by cross-bars at bottom, with the open part upward, and the bearing for the axles of the wheels C C in the upper ends. Either of these precise forms is not necessary in the construction of this carriage, but they are simply introduced as being convenient and economical forms.

The two side-pieces of the carriage D are connected together by means of bolts passing through them, and the wooden beam D′, which is placed between them.

E is a wheel or sheave in the lower part of the carriage, over which the rope or fall F passes, between its point of attachment to the load, attached to the hook W and the sheave $E^1$, which is secured to some stationary beam or timber A. That portion of the fall F, which is between the sheaves E and $E^1$, must be parallel with the iron rod B, or nearly so.

G is a brake, arranged to press against the rope or fall F, where it passes over the sheave E, so as to sustain and hold it in place after it has been raised high enough, while the carriage moves forward on the track B, toward the sheave $E^1$, as will hereafter be more fully explained.

In fig. 1, *a* is a lever, attached to the journal of the brake, outside of the carriage D, for the purpose of operating the brake.

The rope or cord H is attached to one end of the lever *a*, from which point it passes over the sheave $E^2$, and thence down to the weight W′, which weight, applied to the brake, through the medium of the rope H and lever *a*, produces the required amount of friction of the brake upon the fall F.

The lever $a^1$ is connected with the lever *a* by means of a pivot-joint at *x*, and the upper end of it is long enough to extend up above the stop *b*, which it strikes as the carriage returns to the original or loading-station, as shown in the drawings, and the brake is thereby thrown up off the rope or fall, which will then run freely over the sheave E.

I, fig. 3, is a pawl, attached to the carriage D at *i*, and arranged to drop automatically into the hook $I^1$, when the carriage is run back to the position shown in the drawings, for the purpose of holding the carriage stationary during the hoisting of the load.

The pawl is jointed at $a^1$, figs. 3 and 5, so that it may be easily released from the hook $I^1$, even when there is a strain upon it.

The two ends of the pawl are kept in line with each other, when in the hook, as shown in fig. 3, by means of the spring $i^2$ and link $i^3$.

There is a rod, $I^2$, figs. 3 and 5, connected with the pawl at *i*, and from this point it extends downward to the ring $i^4$, which forms its lower end, and through which the fall F is conducted.

The operation of the machine is as follows:

The load to be hoisted is attached to the hook W, which will then be drawn up by means of some power, no matter what, applied to the other end of the fall F. When the weight has been hoisted so high that the hook W will strike against the ring $i^4$, it will thereby raise the rod $I^2$, and so raise and release the pawl from the hook I, as shown in fig. 3; or, as formed in fig. 5, it turns the hook $a^2$ fixed to its axle, and releases a pawl on the axle, under the rod B, from its connection against a stop on the rod, and allows the carriage to go free.

The carriage thus released, will start forward on the rod or track B toward the pulley $E^1$. The tendency of the action of the load at W would then be to run rapidly downward; at the same time the carriage would shoot rapidly forward toward E, thereby subjecting the machine to imminent danger by breakage, were it not that at the very moment that the carriage commences to move forward, the brake G is applied to the fall, when it passes over the sheave E, and completely locking the fall and sheave, holds the weight up to the highest point to which it has been raised, while the steady force applied to the opposite end of the fall, causes the carriage and its suspended load to advance steadily toward the point of delivery, which is in the direction of the sheave $E^1$.

The brake is applied by means of the carriage moving forward sufficiently to release the lever $a^1$, fig. 1, from the stop *b*, when the weight W is allowed to act by its own gravity upon the brake.

When the load has been deposited, and the hook W released, and the power disconnected from the opposite end of the fall, the weight W' will be sufficient to draw the carriage back to its first position, at which, when it arrives, the pawl will drop its hook to retain it there, and the lever $a^1$ will strike the stop *b*, fig. 1, and release the brake, as has been already described.

As soon as the brake is released, the weight of the hook W may be sufficient to lower the fall for another load, or a small cord may be attached to the hook for that purpose.

The brake should be adjusted by some means, so that it can be made to press on the fall at the proper point, and also hard enough to produce the desired result.

In fig. 1, this adjustment is effected by constructing the brake in two parts, *c* and $c^1$, fig. 6, so arranged and combined together, that the part $c^1$ may be extended or contracted at pleasure, by means of the set-screw $c^2$. The rope or fall, at the point where the brake would rest upon it, should be covered with some strong material, such as leather, for the purpose of preventing undue wear.

The above-described are the general features of the invention, but the construction of the various parts may be widely varied by any ordinary mechanic.

Figs. 4, 5, and 6, represent some of the variations which readily suggest themselves. In fig. 4, the device for operating the brake consists of a segmental cog-wheel attached to the outer end of the brake-shaft. This cog-wheel gears into another section of segmental cog-gearing cut on one of the peripheries of a counter-wheel having two radii, and that periphery of it which is described by the longer radius is also indented with cogs or teeth, which gear into a rack, which, as the carriage returns to its position to receive its load, strikes against some stationary stop provided to receive it, and then running back, as the carriage advances, acts through the counter-wheel, with a leverage upon the brake to withdraw it. The brake is applied in this case, as in the one already explained, by means of a weight.

Fig. 6 is a plan of brake with curved and corrugated front, designed to be used with the machinery, as described for fig. 4.

Fig. 5 represents another construction of the pawl for holding the carriage in position during the time the load is being raised to the ring $i^1$. In this construction, the spring applied to the back end of the pawl, and the hook with which the pawl connects, is a simple stop fastened upon the rod B, behind the station of the wheels C C.

Having described this invention,

What is claimed, is—

1. The combination of the carriage D, having the wheels C C arranged to travel upon the track B, and the automatic pawl I, and the automatic adjustable brake G, or their equivalent, when used as and for the purpose set forth.

2. The adjustable brake G, so constructed that it may be set to any required distance from the sheave E.

3. The combination of the parts above described, by which, at the moment the load to be hoisted reaches the proper elevation, the fall F is griped automatically by the brake to the sheave D, or other part of the carriage, and there held until the carriage, with its suspended burden, has been propelled by the horse, or other moving-power, forward, its load discharged, and then returned, drawn by the weight W, to its original position, and then automatically released from the gripe and allowed to run freely over the sheave D, down, for reloading.

A. LOOMIS,
*President Warrior Mower Company.*

Witnesses:
WATTS T. LOOMIS,
SIDNEY A. LOOMIS.